United States Patent [19]
Sano et al.

[11] Patent Number: 5,400,199
[45] Date of Patent: Mar. 21, 1995

[54] FLOATING MAGNETIC HEAD WITH VARIABLE CHAMFERED SURFACE

[75] Inventors: Chitatsu Sano; Hitoshi Maki; Tatsuya Shimizu, all of Yamanashi, Japan

[73] Assignee: TDK Corporation, Tokyo, Japan

[21] Appl. No.: 14,347

[22] Filed: Feb. 5, 1993

[30] Foreign Application Priority Data

Jul. 24, 1992 [JP] Japan ................................ 4-217405

[51] Int. Cl.⁶ ............................................ G11B 5/60
[52] U.S. Cl. ................................................ 360/103
[58] Field of Search ........................ 360/103, 122, 102

[56] References Cited

U.S. PATENT DOCUMENTS 3,823,916  7/1974  Warner ............................ 360/103

FOREIGN PATENT DOCUMENTS 61-80519   4/1986  Japan ................................. 360/103
61-82372   4/1986  Japan ................................. 360/103
4328372   11/1992  Japan ................................. 360/103

Primary Examiner—Robert S. Tupper
Assistant Examiner—David D. Davis
Attorney, Agent, or Firm—Price, Gess & Ubell

[57] ABSTRACT

A monolithic two- or three-rail floating magnetic head capable of carrying out data recording/reproducing with improved reliability. The monolithic floating magnetic head includes two floating rails arranged so as to face a magnetic medium, a magnetic core arranged so as to be positioned at an end of a slider, and a magnetic recording/reproducing gap defined in the magnetic core. At least one of the floating rails which is positioned on a side near the gap is provided at an end thereof defined on a rearward side based on a direction of traveling of the magnetic medium with a chamfered section which is formed at an azimuth angle with respect to an edge of the end. Such construction of the magnetic head permits recording/reproducing of data by the magnetic head to be carried out without picking up a noise and prevents particles from falling off from an end of the head, thus improving reliability of the data recording/reproducing.

6 Claims, 4 Drawing Sheets

FLOATING MAGNETIC HEAD WITH VARIABLE CHAMFERED SURFACE

BACKGROUND OF THE INVENTION

1. Field of the Invention

This invention relates to a floating type magnetic head used for a hard disc unit, and more particularly to a monolithic two- or three-rail floating-type magnetic head which is adapted to be used for recording/reproducing of data of a hard disc and includes a slider provided with two floating rails and a magnetic core.

DESCRIPTION OF THE RELATED ART

A conventional monolithic two-rail floating-type magnetic head is generally constructed in such a manner as shown in FIG. 1. More specifically, a conventional two-rail floating magnetic head generally designated at reference numeral 100 in FIG. 1 includes a pair of floating rails 102 disposed opposite to a magnetic record medium, although only one of the rails 102 is shown in FIG. 1. The floating rails 102 are each so arranged that an end 104 of each of the rails defined on a rearward side thereof based on a direction of traveling of the magnetic medium is formed in a manner to be perpendicular to the direction of traveling of the magnetic medium. A conventional monolithic three-rail floating magnetic head 110 is likewise constructed as shown in FIG. 2.

In the conventional two-rail floating magnetic head 100, as described above and shown in FIG. 1, the end 104 of each of the rails 102 arranged opposite to the magnetic medium is formed perpendicular to the direction of traveling of the magnetic medium; and moreover, a magnetic core is provided at a corner of one of the rails 102. Unfortunately, such construction causes the corresponding end 104 of the rail 102 to pick up information stored in the magnetic medium, leading to the generation of a noise having a level of −50 to −55 dB. The noise thus picked up by the corresponding end 104 of the rail 102 disturbs a reproduced waveform which is anticipated, resulting in deteriorating reproduction reliability. It would be surmised that this is due to a structure of the conventional magnetic head in which a recording/reproducing gap 108 of a magnetic core 106 is positioned in close proximity to the end 104 of the rail 102.

In the conventional monolithic three-rail floating magnetic head shown in FIG. 2, which is commonly referred to as a "Winchester head" in the art, an end 114 of each of rails 112 is arranged apart from a gap 118 of a magnetic core 116. Nevertheless, there has been a recent tendency to decrease the size of a slider, and correspondingly, the ratio of the width of the rails to the width of the slider has been increased, thus causing the gap 118 for recording/reproducing to be positioned in proximity to the ends 104 of the rails 102, and resulting in generation of a noise having a level of −55 to −60 dB. Such a disadvantage is particularly encountered in the conventional monolithic three-rail floating magnetic head of the shrink-type which has dimensions of 2.896 mm in length and 2.24 mm in width.

SUMMARY OF THE INVENTION

The present invention has been made in view of the foregoing disadvantage of the prior art.

Accordingly, it is an object of the present invention to provide a monolithic floating-type magnetic head which is capable of carrying out recording/reproducing of data with greatly increased reliability.

It is another object of the present invention to provide a monolithic floating-type magnetic head which is capable of preventing floating rails from picking up any undesired noise during recording/reproducing of data.

It is a further object of the present invention to provide a monolithic floating-type magnetic head which is capable of being safely serviceable while minimizing falling off of particles from an end of the head.

In accordance with one aspect of the present invention, a monolithic floating-type magnetic head is provided. The magnetic head includes a slider having a rectangular prism like shape, two floating rails arranged on the slider so as to face a magnetic medium, a magnetic core arranged so as to be positioned at one end of the slider on a rearward side thereof and a magnetic recording/reproducing gap defined in the magnetic core so as to face the magnetic medium. At least one of the floating rails, of which a rear end is positioned on a side near the magnetic gap, is provided at the rear end thereof with a chamfered section which is formed at a predetermined azimuth angle with respect to the rear end.

In accordance with another aspect of the present invention, a monolithic two-rail floating magnetic head is provided. The magnetic head includes two floating rails arranged so as to face a magnetic medium, a magnetic core arranged so as to be positioned at a corner of one of the floating rails, and a magnetic recording/reproducing gap defined in the magnetic core. The one floating rail on which the magnetic core is arranged is provided at an end thereof defined on a rearward side thereof based on a direction of traveling of the magnetic medium with a chamfered section which is formed at an azimuth angle with respect to an edge of the end.

In a preferred embodiment of the present invention, the azimuth angle of the chamfered section may be within the range of 2 to 20 degrees. Alternatively, the azimuth angle of the chamfered section may be within the range of −2 to −20 degrees.

In a preferred embodiment of the present invention, the chamfered section is formed into a flat surface having a chamfer angle of between 30 degrees and 60 degrees.

In accordance with still another aspect of the present invention, a shrink-type three-rail floating magnetic head is provided. The magnetic head includes a pair of floating rails each provided at an end thereof, which end is positioned near a magnetic gap, with a chamfered section which is formed at a predetermined azimuth angle with respect to an edge of the end.

In a preferred embodiment of the present invention, the azimuth angle of the chamfered section is defined to be 2 to 15 degrees or −2 to −15 degrees.

In a prefered embodiment of the present invention, a chamber angle of the chamfer section is defined to be between 30 degrees and 60 degrees.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
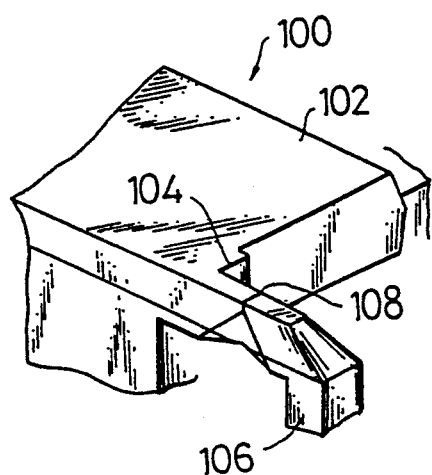
FIG. 1 is a fragmentary perspective view showing an essential part of a conventional monolithic two-rail floating-type magnetic head.
Figure 2:
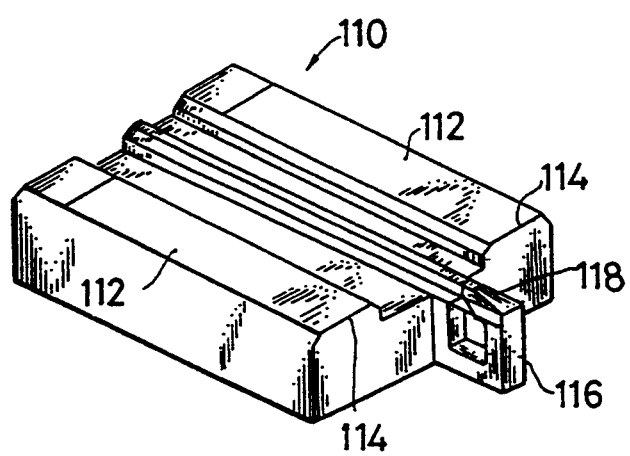
FIG. 2 is a perspective view showing a conventional monolithic three-rail floating-type magnetic head.
Figure 3:
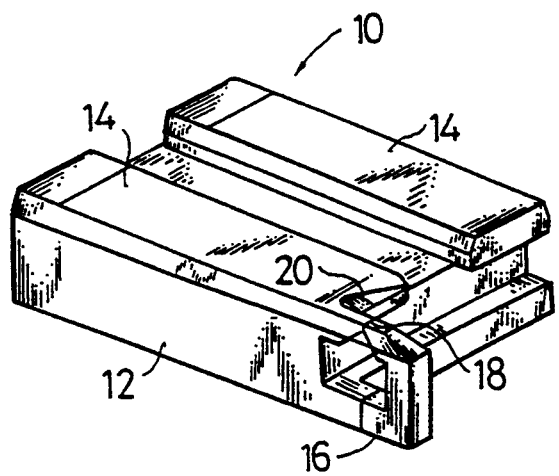
FIG. 3 is a perspective view showing an embodiment of a floating magnetic head according to the present invention.
Figure 4:
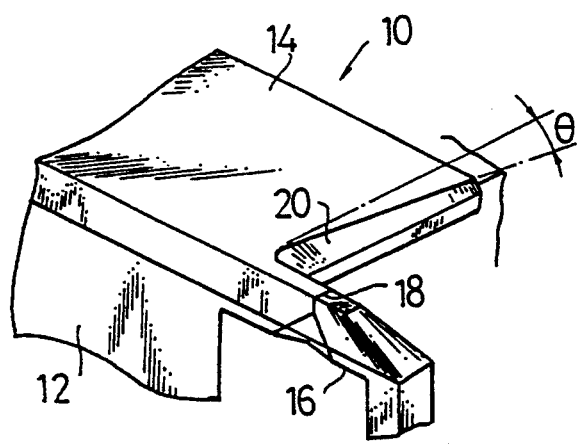
FIG. 4 is a fragmentary enlarged perspective view showing an essential part of the magnetic head shown in FIG. 3.

Now, a floating magnetic head according to the present invention will be described hereinafter with reference to FIGS. 3 to 9, wherein like reference numerals designate like or corresponding parts throughout.

Referring first to FIGS. 3 to 6, an embodiment of a floating magnetic head according to the present invention is illustrated. A floating magnetic head of the illustrated embodiment which is generally designated at reference numeral 10 is in the form of a monolithic two-rail floating-type magnetic head. The floating magnetic head 10 includes a slider 12 of a rectangular prism like shape, which is provided on a surface thereof contacted with a magnetic medium with a pair of floating rails 14. Also, the slider 12 is provided at one corner thereof with a magnetic core 16. The floating magnetic head 10 is also provided with a magnetic recording/reproducing gap 18 defined in the magnetic core 16 on the side of one of the floating rails 14. The floating rail 14 on which the gap 18 is arranged is provided at an end thereof defined on a downstream or rearward side thereof on the basis of a direction of traveling of the magnetic medium with a chamfered section 20 which is formed at a predetermined azimuth angle $\theta$ with respect to an edge of the end of the floating rail 14. The azimuth angle $\theta$ may be defined to be 2 to 20 degrees or −2 to −20 degrees with respect to the edge of the end of the floating rail 14.

In the art, the term "azimuth angle" is generally used to indicate an inclination angle of a magnetic recording/reproducing gap defined on the basis of a direction perpendicular to a direction of traveling of a magnetic record medium. However, this term is used herein to indicate an angle defined on the basis of the magnetic recording/reproducing gap 18 since the gap 18 is substantially perpendicular to the direction of traveling of the magnetic record medium. Also, in the specification, the azimuth angle in a clockwise direction is defined to be positive and that in a counterclockwise direction is defined to be negative.

The chamfered section 20 may be formed into a predetermined chamfer angle $\theta_1$. However, it is preferably formed into a chamfer angle $\theta_1$ of between about 30 degrees and about 60 degrees, because such an angle minimizes or substantially prevents ceramic particles from falling off of the magnetic head or chamfered section. The chamfered section 20 may be formed into a flat surface by grinding using a grinding wheel or by squeezing.

For example, when the azimuth angle $\theta$ is set to be 2°, 7° or 20° and the chamfer angle $\theta_1$ is set to be 45°, the noise level is decreased to −70 dB or less, so that the magnetic head of the illustrated embodiment may effectively carry out magnetic recording/reproducing with substantially increased reliability as compared with the prior art.

Figure 5:
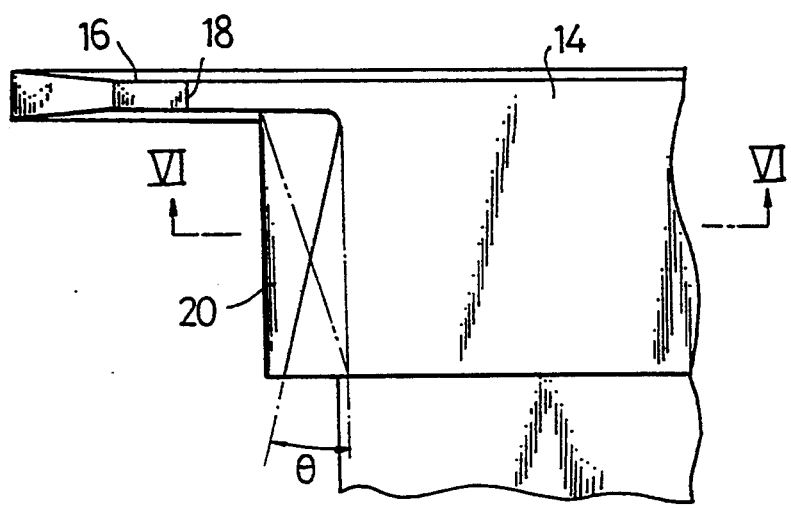
FIG. 5 is a fragmentary enlarged plan view of the essential part shown in FIG. 4.
Figure 6:
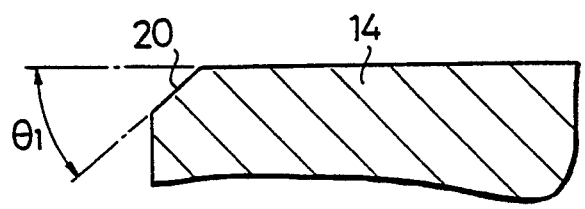
FIG. 6 is a vertical sectional view taken along line VI—VI of FIG. 5.

In the illustrated embodiment, the azimuth angle $\theta$ may be set in such a manner as indicated by solid lines in FIG. 5. Alternatively, it may be set in such a manner as indicated by phantom lines in FIG. 5. The azimuth angle $\theta$ of less than 2 degrees substantially prevents the chamfered section 20 from being formed, so that the edge of the floating rail 14 is arranged close to the gap 18 and thus the noise level fails to be decreased, whereas the azimuth angle of above 20 degrees causes a decrease in the strength of a proximal portion of the magnetic head. Thus, the azimuth angle $\theta$ is preferably set to be between 2 degrees and 20 degrees. For the same reason, it is preferably set between −2 degrees and −20 degrees.

Table 1 shows the results when the illustrated embodiment, the prior art (FIG. 1) and comparative examples were compared.

TABLE 1

| Magnetic Head No. | Chamfer Angle (degree) | Azimuth Angle (degree) | Noise Level (dB) | Track Strength |
|---|---|---|---|---|
| 1 (Prior art of FIG. 1) | — | 0 | −50 to −55 | ○ |
| 2 (Comparative Example 1) | 45 | 0 | −65 to −70 | ○ |
| 3 (Embodiment No. 1) | 45 | 2 | −70 or below | ○ |
| 4 (Embodiment No. 2) | 45 | 7 | −70 or below | ○ |
| 5 (Embodiment No. 3) | 45 | 20 | −70 or below | △ |
| 6 (Comparative Example 2) | 45 | 25 | −70 or below | X |

○: sufficiently high
△: rather low
X: low

In Table 1, Magnetic Head No. 2 (Comparative Example 1) was so constructed that a chamfered section was uniformly formed so as to be parallel to an edge of a rearward end of a floating rail while a chamfer angle $\theta$ with respect to the edge was set at 45 degrees. The term "track strength" indicates strength of a portion near the gap of the magnetic core. In Magnetic Head No. 6 (Comparative Example 2), microscopic cracks and defects are liable to appear in the portion near the gap of the magnetic core.

Figure 7:
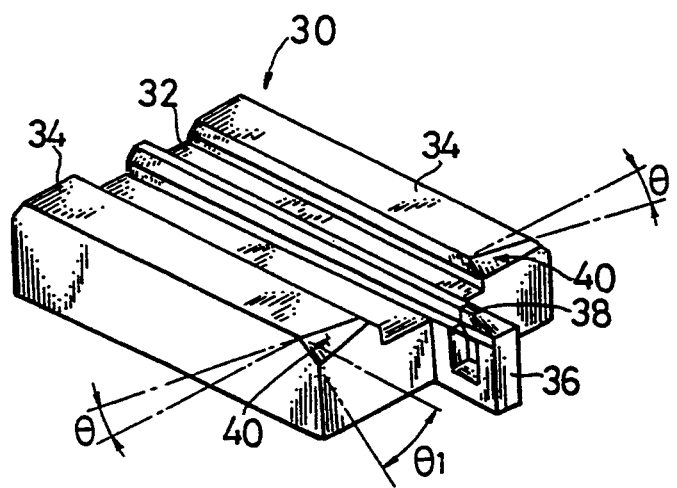
FIG. 7 is a perspective view showing another embodiment of a floating magnetic head according to the present invention.
Figure 8:
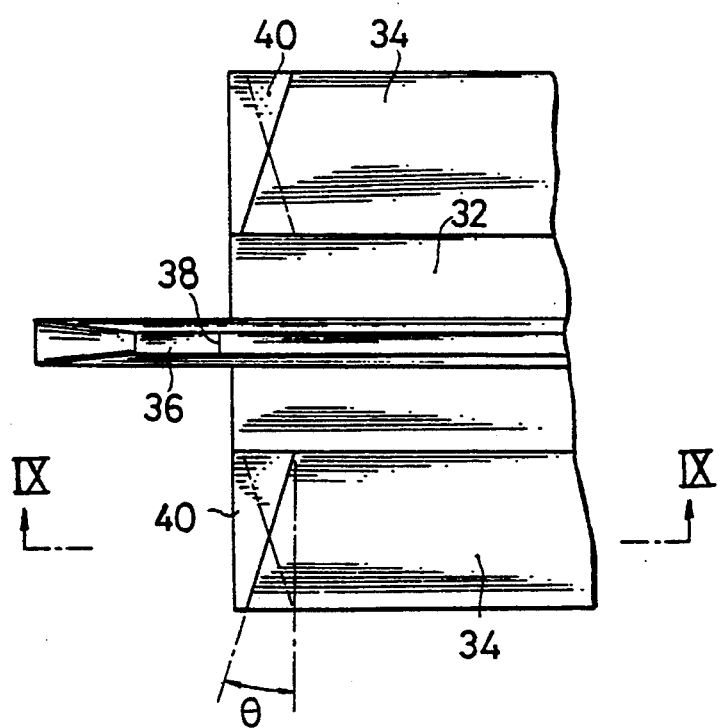
FIG. 8 is a fragmentary enlarged schematic plan view showing an essential part of the magnetic head of FIG. 7.
Figure 9:
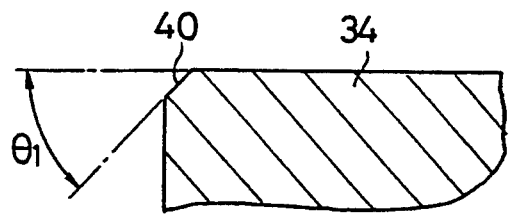
FIG. 9 is a vertical sectional view taken along line IX—IX of FIG. 8.

Referring now to FIGS. 7 and 8, another embodiment of a floating magnetic head according to the present invention is illustrated. A floating magnetic head of the illustrated embodiment generally designated at reference 30 is constructed in the form of a shrink-type monolithic three-rail floating-type magnetic head. The term "shrink-type" used herein, as described above, means a three-rail magnetic head having a length of 2.896 mm and a width of 2.24 mm. The word "length" means a distance defined between a forward end of a slider and a magnetic recording/reproducing gap in a direction of traveling of a magnetic record medium and the word "width" means a dimension of the slider defined in a direction perpendicular to the direction of traveling of the magnetic medium. A three-rail magnetic head, as described above, is generally referred to as a "Winchester head" in the art.

More particularly, the magnetic head of the illustrated embodiment includes a slider 32 which is provided on both sides thereof with a pair of rails 34. The slider 32 is provided at a central portion of an end thereof defined on a downstream or rearward side thereof on the basis of a direction of traveling of a magnetic medium with a magnetic core 36. The slider 32 is also provided with an additional rail between the floating rails 34. The magnetic core 36 is contiguous to the additional rail. A magnetic recording/reproducing gap 38 is defined in the the magnetic core 36 so as to face the magnetic medium. The rails 34 are each provided at an end thereof defined on the rearward side on the basis of the direction of traveling of the magnetic medium with a chamfered section 40 which is formed at a predetermined azimuth angle $\theta$ with respect to an edge of the end of the corresponding rail and a predetermined chamfer angle $\theta_1$. In the illustrated embodiment, the azimuth angle $\theta$ may be defined to be 2 to 15 degrees or $-2$ to $-15$ degrees with respect to the edge of the end of each of the rails 34 and the chamfer angle $\theta_1$ may be defined to be between 30 degrees and 60 degrees. In the illustrated embodiment as well the chamfered section 40 of each of the rails 34 may be similarly formed in such a manner as indicated by solid lines or phantom lines as shown in FIG. 8. Also, the chamfered sections 40 may be formed so as to have the azimuth in the same direction or directions different from each other.

Table 2 shows the results when the illustrated embodiment, the prior art and comparative examples were compared.

TABLE 2

| Magnetic Head No. | Chamfer Angle (degree) | Azimuth Angle (degree) | Noise Level (dB) | Working Properties |
|---|---|---|---|---|
| 1 (Prior art, Shrink Type) | 45 | 0 | −55 to −60 | ○ |
| 2 (Embodiment No. 1) | 45 | 3 | −65 to −70 | ○ |
| 3 (Embodiment No. 2) | 45 | 7 | −65 to −70 | ○ |
| 4 (Embodiment No. 3) | 45 | 10 | −65 to −70 | ○ |
| 5 (Embodiment No. 4) | 45 | 15 | −65 to −70 | ○ |
| 6 (Comparative Example 2) | 45 | 20 | −65 to −70 | X |
| 7 (Comparative Example 3)* | 45 | 0 | −65 to −70 | ○ |

○: well
X: bad
*Comparative Example 3 is a so-called miniature-type three-rail magnetic head of 4.115 mm in length and 3.20 mm in width.

In Table 2, Magnetic Head No. 1 corresponds to the magnetic head shown in FIG. 1 which is additionally provided with a parallel chamfered section. Magnetic Head No. 7 is a miniature-type head having a size larger than the shrink-type magnetic head and was tested to compare it with the prior art magnetic head. Table 2 indicates that the shrink-type magnetic head of the illustrated embodiment which has a size smaller than the conventional miniature-type head exhibits the same noise level as the miniature-type head.

As can be seen from the foregoing, the floating magnetic head of the present invention is directed to the monolithic two-rail or shrink-type monolithic three-rail floating-type magnetic head in which the two rails are arranged so as to face a magnetic medium and the magnetic core is provided at one end of the slider, wherein at least one of the floating rails, which is positioned on a side near the gap, is provided at the end thereof defined on the rearward side thereof based on the direction of traveling of the magnetic medium with the chamfered section which is formed at an azimuth angle with respect to an edge of the end. Thus, the floating magnetic head of the present invention accomplishes recording/reproducing of data with highly increased reliability without picking up any undesired noise and can be safely serviced.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A floating magnetic head for transducing information upon a recording surface of a magnetic medium during relative movement between the magnetic head and the recording surface, the magnetic head comprising:

a slider body having a rectangular shape and a forward edge, a trailing edge, first and second longitudinal side edges, a bottom side facing the magnetic medium, and a top side opposite the bottom side;

first and second longitudinal side rails projecting from the bottom side of the slider body toward the magnetic medium, the side rails positioned along the first and second side edges of the slider body, respectively, each rail further having a forward edge and a trailing edge positioned proximate the forward and trailing edges of the slider body, respectively, and a planar bottom surface facing and generally parallel to the recording surface of the magnetic medium and generally perpendicular to the forward and trailing edges of the side rails;

a magnetic core longitudinally aligned with the first rail and positioned externally of the slider body and proximate the trailing edge of the first rail, the core having a bottom surface facing the magnetic medium with a first and second portion, the first portion being substantially coplanar with the bottom surface of the first rail, and the second portion sloping away from the magnetic medium and the slider body;

a magnetic recording/reproducing gap in the magnetic core positioned between the first portion of the core and the slider body; and a planar chamfer section positioned between the planar bottom surface and the trailing edge of at least one of the side rails, the planar chamfer section sloping away from the magnetic medium and the slider body at a predetermined chamfer angle $\theta_1$; the planar chamfer section intersecting the plane of the bottom surface of the rail to form a lower edge, the lower edge forms a line, which intersects a line perpendicular to the longitudinal side edge to form an acute azimuth angle $\theta$; the planar chamfered section substantially increasing the reliability of waveform reproduction by limiting undesired noise and minimizing disturbances in reproduced waveforms.

2. The floating magnetic head of claim 1 wherein the predetermined azimuth angle $\theta$ is between 2 and 20 degrees.

3. The floating magnetic head of claim 1 wherein the predetermined chamfer angle $\theta_1$ is between 30 and 60 degrees.

4. A floating magnetic head for transducing information upon a recording surface of a magnetic medium during relative movement between the magnetic head and the recording surface, the magnetic head comprising:

a slider body having a rectangular shape and a forward edge, a trailing edge, first and second longitudinal side edges, a bottom side facing the magnetic medium, and a top side opposite the bottom side;

first and second longitudinal side rails projecting from the bottom side of the slider body toward the magnetic medium, the side rails positioned along the first and second side edges of the slider body, respectively, each rail further having a forward edge and a trailing edge positioned proximate the forward and trailing edges of the slider body, respectively, and a planar bottom surface facing and generally parallel to the recording surface of the magnetic medium and generally perpendicular to the forward and trailing edges of the side rails;

a center longitudinal rail projecting from the bottom side of the slider toward the magnetic medium, positioned between, and parallel to, the first and second side rails, the center rail having a forward edge, a trailing edge, two side edges, and a generally planar bottom surface facing the magnetic medium, the bottom surface being generally parallel to the surface of the magnetic medium;

a magnetic core longitudinally aligned with the center rail and positioned externally of the slider body and proximate the trailing edge of the center rail, the core having a bottom surface facing the magnetic medium with a first and second portion, the first portion being substantially coplanar with the bottom surface of the center rail, and the second portion sloping away from the magnetic medium and the slider body;

a magnetic recording/reproducing gap in the magnetic core positioned between the first portion of the core and the slider body; and a planar chamfer section positioned between the planar bottom surface and the trailing edge of at least one of the side rails, the planar chamfer section sloping away from the magnetic medium and the slider body at a predetermined chamfer angle $\theta_1$; the planar chamfer section intersecting the plane of the bottom surface of the rail to form a lower edge, the lower edge forms a line, which intersects a line perpendicular to the longitudinal side edge to form an acute azimuth angle $\theta$; the planar chamfered section substantially increasing the reliability of wave reproduction by limiting undesired noise and minimizing disturbances in reproduced waveforms.

5. The floating magnetic head of claim 4 wherein the predetermined azimuth angle $\theta$ is between 2 and 15 degrees.

6. The floating magnetic head of claim 4 wherein the predetermined chamfer angle $\theta_1$ is between 30 and 60 degrees.

* * * * *